United States Patent
Lin et al.

(10) Patent No.: US 9,073,788 B2
(45) Date of Patent: Jul. 7, 2015

(54) CERAMIC PAINTS AND PROTECTIVE COATINGS

(75) Inventors: Hsueh-Tso Lin, Taipei (TW); Kuan-Ching Chen, Taipei (TW); Dick Zhong, Taipei (TW)

(73) Assignee: GRAND TEK ADVANCE MATERIAL SCIENCE CO., LTD., Taipei (TW)

( * ) Notice: Subject to any disclaimer, the term of this patent is extended or adjusted under 35 U.S.C. 154(b) by 413 days.

(21) Appl. No.: 13/403,670

(22) Filed: Feb. 23, 2012

(65) Prior Publication Data

US 2013/0149524 A1 Jun. 13, 2013

(30) Foreign Application Priority Data

Dec. 12, 2011 (TW) .............................. 100145726 A

(51) Int. Cl.
| | |
|---|---|
| C09D 7/12 | (2006.01) |
| C09D 127/12 | (2006.01) |
| C09D 127/18 | (2006.01) |
| C09D 127/20 | (2006.01) |
| C09D 183/00 | (2006.01) |
| C04B 35/14 | (2006.01) |
| C23C 28/04 | (2006.01) |

(52) U.S. Cl.
CPC .............. *C04B 35/14* (2013.01); *Y10T 428/25* (2015.01); *Y10T 428/3154* (2015.04); *C09D 183/00* (2013.01); *C09D 127/12* (2013.01); *C09D 7/1266* (2013.01); *C09D 127/20* (2013.01); *C09D 127/18* (2013.01); *C23C 28/042* (2013.01)

(58) Field of Classification Search
None
See application file for complete search history.

(56) References Cited

U.S. PATENT DOCUMENTS

| | | | |
|---|---|---|---|
| 6,699,303 B2 | 3/2004 | Hansz et al. | |
| 7,635,522 B2 | 12/2009 | Cnossen et al. | |
| 2004/0171736 A1* | 9/2004 | Dadalas et al. | ............... 524/544 |
| 2008/0061068 A1 | 3/2008 | Fontaine | |

FOREIGN PATENT DOCUMENTS

| | | |
|---|---|---|
| CN | 101037351 | 9/2007 |
| CN | 101760057 | 6/2010 |
| JP | 08066314 A * | 3/1996 |

OTHER PUBLICATIONS

Machine translation of JP 08-066314A, Mar. 1996.*
English language translation of JP 08-066314A, Mar. 1996.*

* cited by examiner

*Primary Examiner* — Ramsey Zacharia
(74) *Attorney, Agent, or Firm* — Muncy, Geissler, Olds & Lowe, P.C.

(57) ABSTRACT

Disclosed is a ceramic paint, including a mixture of a silica sol-gel, 20 to 60 parts by weight of filler, and 1 to 50 parts by weight of a fluorine-containing polymer, wherein the silica sol-gel is formed by reacting 100 parts by weight of silica sol, 50 to 100 parts by weight of organic silane, and 0.3 to 1 parts by weight of a catalyst.

16 Claims, 1 Drawing Sheet

CERAMIC PAINTS AND PROTECTIVE COATINGS

CROSS REFERENCE TO RELATED APPLICATIONS

This application claims priority of Taiwan Patent Application No. 100145726, filed on Dec. 12, 2011, the entirety of which is incorporated by reference herein.

BACKGROUND OF THE INVENTION

1. Field of the Invention

The disclosure relates to a non-stick structure, and in particular relates to a composition thereof and a method for manufacturing the same.

2. Description of the Related Art

Fluorine-containing polymers, having high thermal resistance, super climate resistance, corrosion resistance, excellent self-cleaning properties, chemical inertia, and extremely low surface energies, are widely utilized in non-stick serial products, such as non-stick woks, high temperature resistant aluminum plates, and copper plates. A coating based on polytetrofluoroethylene (PTFE) is usually coated on conventional kitchenware. In U.S. Pub. No. 2008/061068A1, a coating, including a fluorocarbon resin (e.g. Teflon) and an inorganic compound, is coated on a metal support to complete a cooking tool, which has excellent non-stick properties. In U.S. Pat. No. 7,635,522 B2, a sol-gel coating includes fluorine-containing polymer particles averagely dispersed therein. A product coated by the sol-gel coating has excellent non-stick properties. Although PTFE can have excellent non-stick properties for a long period, the PTFE film is too soft to resist abrasion at high temperatures. In addition, the PTFE has insufficient hardness at high temperatures.

Ceramic materials, having high thermal resistance, anti-oxidation, corrosion resistance, and abrasion resistance, are utilized in the structural material of blades, molds, or bearings. The brittle ceramic material has disadvantages such as low bending strength and poor toughness, thereby being largely limited to the application of a structural member. Ceramic paint is formed on a metal surface to combine the advantages of metal and ceramic, thereby obtaining a strong surface coating having multiple functions. In U.S. Pat. No. 6,699,303 B2, a non-stick cermet coating, a mixture of ceramic and cermet, is utilized in cooking tools. The cermet coating has high hardness and high abrasion resistance. In CN Pub. No. 101037351, a non-stick ceramic used to wrap an object is prepared by a sol-gel method. The non-stick ceramic may enhance abrasion resistance, surface hardness, and abrasion period of the wrapping material.

The non-stick properties of the ceramic paint come from silicon oil such as polydimethylsiloxane or hydroxypolydimethylsiloxane. However, the silicon oil in the ceramic paint gradually evaporates by cooking, such that the ceramic paint will lose its non-stick properties. Because a detersive for a washing wok or pan is usually alkaline, the silicon oil on the coating surface and in the coating is easily washed out by the detersive at high temperatures at an alkaline condition. In other words, the wok will lose its non-stick properties after washing. Accordingly, the ceramic paint has excellent hardness, abrasion resistance, and thermal resistance, but its non-stick properties cannot be maintained for a long period.

BRIEF SUMMARY OF THE INVENTION

One embodiment of the disclosure provides a ceramic paint, comprising: a mixture of a silica sol-gel, 20 to 60 parts by weight of filler, and 1 to 50 parts by weight of a fluorine-containing polymer, wherein the silica sol-gel is formed by reacting 100 parts by weight of silica sol, 50 to 100 parts by weight of organic silane, and 0.3 to 1 parts by weight of a catalyst.

One embodiment of the disclosure provides a protective coating, comprising: a primer on a substrate; and a finish coat on the primer, wherein the primer is a ceramic paint including a mixture of a silica sol-gel and 20 to 60 parts by weight of filler, wherein the silica sol-gel is formed by reacting 100 parts by weight of silica sol, 50 to 100 parts by weight of organic silane, and 0.3 to 1 parts by weight of a catalyst, and the finish coat comprises a fluorine-containing polymer.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
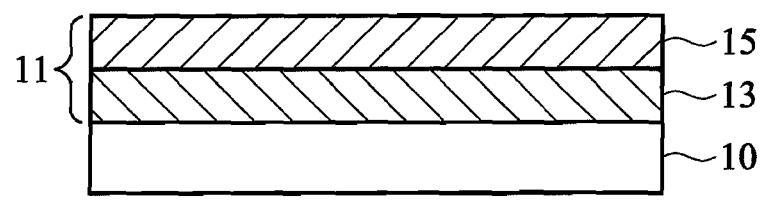
FIG. 1 shows a protective coating in one embodiment of the disclosure.

The following description is of the best-contemplated mode of carrying out the invention. This description is made for the purpose of illustrating the general principles of the invention and should not be taken in a limiting sense. The scope of the invention is best determined by reference to the appended claims.

The major purpose of the disclosure is to provide a ceramic paint, which is served as a primer of a protective coating. The primer of the ceramic paint has excellent adhesion with the underlying substrate, hot hardness, cold hardness, corrosion resistance, and excellent adhesion with an overlying finish coat of a fluorine-containing polymer. A finish coat of a fluorine-containing polymer can be spray coated on the ceramic paint to form a protective coating with excellent non-stick properties for a long period. The protective coating may serve as a demoldable and/or hydrophobic protective coating.

In one embodiment, the ceramic paint includes: a mixture of a silica sol-gel, 20 to 60 parts by weight of filler, and 1 to 50 parts by weight of a fluorine-containing polymer, wherein the silica sol-gel is formed by reacting 100 parts by weight of silica sol, 50 to 100 parts by weight of organic silane, and 0.3 to 1 parts by weight of a catalyst.

The silica sol, defined as water soluble silica, provides silica particles in the ceramic paint to enhance the strength and hardness of the silicon ceramic network. In one embodiment, the silica sol has a solid content of 20% to 50%, and the solid has a particle diameter of 10 nm to 50 nm. The silica sol can be stabilized by sodium ions, stabilized by ammonium ions, or treated by alumina. A silica sol having an overly low solid content will make the ceramic paint contain too much water, such that the ceramic paint would be difficult to process and be easily blasted. A silica sol having an overly high solid content would not be stable, thus, large particles therein would be easily formed.

Organic silane can be methyltrimethoxy silane and/or methyltriethoxy silane, and preferably methyltrimethoxy silane. In addition, 5 parts to 10 parts by weight of another organic silane such as tetramethoxy silane, tetraethoxy silane, dimethyldimethoxy silane, dimethyldiethoxy silane, phenyltrimethoxy silane, or combinations thereof can be reacted with other agents to form the silica sol-gel, which may further tune the hardness of the ceramic paint. The organic silane may react with the silica sol to form the silica sol-gel. The ceramic paint formed from an overly high amount of the organic silane will condense too much in a baking process due to over dehydration (or removal of methanol or ethanol), such that the protective coating would chap or even peel easily. The ceramic paint formed from an overly low amount of the organic silane would make adherence to the substrate difficult, making peeling more easy.

The catalyst can be formic acid, acetic acid, hydrochloric acid, citric acid, methyl formate, ethyl acetoacetate, maleic anhydride, or combinations thereof. The catalyst may accelerate the hydrolysis rate of the organic silane and the reaction between the hydrolyzed organic silane and the silica sol. The reaction of the organic silane and the silica sol will have a pH value of less than 4.0 with an overly high amount of the catalyst, and a pH value of higher than 6.5 with an overly low amount of the catalyst. The ceramic paint formed by the reaction with an overly high or overly low pH value may have non-brightness, poor adhesion to the substrate, and even pulverization appearance.

The filler can be silica such as silica powder or melt quartz powder, alumina such as alumina fiber, zirconium dioxide, silicon carbide such as silicon carbide fiber, aluminum nitride, boron nitride, kaolin, talcum powder, mica powder, silicate of aluminum or zirconium, barium sulfate, metal fiber, stainless powder, or combinations thereof, and preferably silica, alumina, silicon carbide, talcum powder, zirconium dioxide, or combinations thereof. The filler may enhance the abrasive resistance of the protective coating. A ceramic paint containing an overly high amount of the filler would make it difficult for adherence to the substrate, such that chapping would occur more easily. The ceramic paint containing an overly low amount of the filler would make the product have poor abrasion resistance and low hardness. In one embodiment, the filler has a particle diameter of 0.05 μm to 30 μm. A ceramic paint containing an overly large filler would have a rough surface, such that a finish coat spray coated thereon will have low brightness and poor non-stick properties. A ceramic paint containing an overly small filler would have high viscosity due its high oil adsorption capacity, thereby influencing the processability of the spray coating.

In a conventional aqueous non-stick coating containing PTFE, the primer and finish coat is combined during baking. The polytetrofluoroethylene (PTFE) and tetrafluoroethylene-hexafluoropropylene copolymer (TFE/HFP, FEP) in the primer are separated to different layers. The separated PTFE is further melted with the PTFE and tetrafluoroethylene-perfluoroalkylvinylether copolymer (TFE/PAVE, PFA) in the finish coat. As such, the adhesion between the primer and the finish coat may be completed. In the disclosure, the fluorine-containing polymer of the finish coat partially permeates into the ceramic paint of the primer to complete the adhesion between the ceramic paint and the fluorine-containing polymer. In other words, the ceramic paint may meet the requirement of interlayer adhesion without containing the fluorine-containing polymer.

The ceramic paint may contain a fluorine-containing polymer to further enhance the interlayer adhesion between the ceramic paint of the primer and the fluorine-containing polymer of the finish coat. The fluorine-containing polymer added to the primer paint can be polytetrofluoroethylene (PTFE), tetrafluoroethylene-perfluoroalkylvinylether copolymer (TFE/PAVE, PFA), tetrafluoroethylene-perfluoromethylvinylether copolymer (TFE/PMVE, MFA), tetrafluoroethylene-hexafluoropropylene copolymer (TFE/HFP, FEP), tetrafluoroethylene-ethylene copolymer (TFE/ethylene, ETFE), or combinations thereof. The fluorine-containing polymer type can be a particle, powder, or emulsion. Note that the described fluorine-containing polymer only includes a low amount of perfluorooctanoic acid (PFOA) or is totally free of PFOA. The fluorine-containing polymer added to the ceramic paint may enhance the interlayer adhesion between the ceramic paint of the primer and the fluorine-containing polymer of the finish coat. A ceramic paint containing an overly high amount of the fluorine-containing polymer will have low hardness and low abrasion resistance.

In one embodiment, the ceramic paint further includes 20 to 60 parts by weight of color powder to tune a color thereof for decoration. The color powder can be an inorganic color powder, such as a white powder of titanium oxide or zinc sulfide, a black powder of copper-chromium-manganese oxide, copper-manganese oxide, copper-manganese-iron oxide, or iron oxide, a yellow powder of titanium yellow or bismuth yellow, a green powder of cobalt green or chromium oxide, and blue powder such as cobalt-chromium-aluminum oxide. The color powder can be used individually or be combined. The color powder should not be poisonous, when in contact with food, if the use of the ceramic paint contains food contact.

The disclosure also provides a method of manufacturing the ceramic paint. The silica sol, the color powder, and the filler are mixed and grinded for 6 hours, and then filtered by a strainer of 100 meshes to form an Agent A. The organic silane and the catalyst are mixed to form an Agent B. The Agent A and the Agent B are ripened in a sealed container for 3 to 8 hours to form a ceramic paint.

If the fluorine-containing polymer particle (or powder) is further added to the ceramic paint, the silica sol, the color powder, and the filler are mixed to grind for 6 hours. The fluorine-containing polymer particle (or powder) is added to the grinded mixture to grind for additional 2 hours, and then filtered by a strainer of 100 meshes to form an Agent A. The organic silane and the catalyst are mixed to form an Agent B. The Agent A and the Agent B were ripened in a sealed container for 3 to 8 hours to form a ceramic paint.

If the fluorine-containing polymer emulsion is further added to the ceramic paint, the silica sol, the color powder, and the filler are mixed to grind for 6 hours, and then filtered by a strainer of 100 meshes to form an Agent A. The organic silane and the catalyst are mixed to form an Agent B. The Agent A and the Agent B are ripened in a sealed container for 3 to 8 hours, and then mixed with the fluorine-containing polymer emulsion to form a ceramic paint.

As shown in FIG. 1, the protective coating 11 formed on the substrate 10 has the primer 13 of the ceramic paint and the finish coat 15 containing the fluorine-containing polymer such as polytetrofluoroethylene (PTFE), tetrafluoroethylene-perfluoroalkylvinylether copolymer (TFE/PAVE, PFA), tetrafluoroethylene-perfluoromethylvinylether copolymer (TFE/PMVE, MFA), tetrafluoroethylene-hexafluoropropylene copolymer (TFE/HFP, FEP), tetrafluoroethylene-ethylene copolymer (TFE/ethylene, ETFE), or combinations thereof. The fluorine-containing polymer can be a particle, powder, or emulsion. In one embodiment, the color powder and/or pearl powder can be added to the ceramic paint to tune the color and brightness of the primer 15. Note that the fluorine-containing polymer in the finish coat 15 only includes a low amount (<20 ppm) of PFOA or is totally free of PFOA.

The finish coat 15 can be formed from an aqueous emulsion of the fluorine-containing polymer, or a powder of the fluorine-containing polymer.

Figure 2:
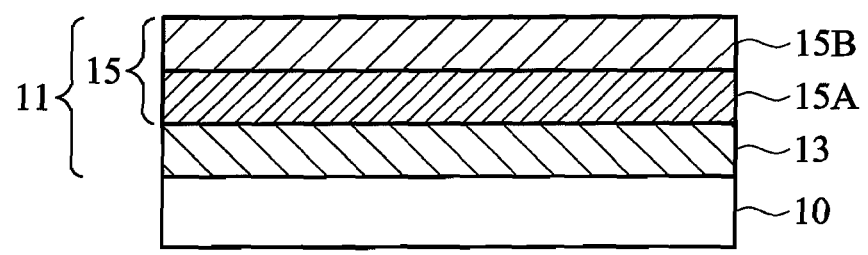
FIG. 2 shows a protective coating in one embodiment of the disclosure.

The finish coat 15 can be a single-layered structure as shown in FIG. 1, however, it can also be a two-layered structure. As shown in FIG. 2, the finish coat has a bottom layer 15A and a top layer 15B, both of them include polytetrofluoroethylene (PTFE), tetrafluoroethylene-perfluoroalkylvinylether copolymer (TFE/PAVE, PFA), tetrafluoroethylene-perfluoromethylvinylether copolymer (TFE/PMVE, MFA), tetrafluoroethylene-hexafluoropropylene copolymer (TFE/HFP, FEP), tetrafluoroethylene-ethylene copolymer (TFE/ethylene, ETFE), or combinations thereof. The top layer 15B has a transparency higher than that of the bottom layer 15A. The differences between the top layer 15B and the bottom layer 15A are that the color powder amount in the top layer 15B is less than that of the bottom layer 15A, and the fluorine-containing polymer amount of the top layer 15B is higher than that of the bottom layer 15A. In some embodiments, the top layer 15B can be totally tetrafluoroethylene-perfluoroalkylvinylether copolymer (TFE/PAVE, PFA). In general, the finish coat containing more PFA has higher transparency and higher non-stick properties. Compared to the bottom layer 15A, the top layer 15B has non-stick properties and corrosion resistance for a longer period. For example, the bottom layer 15A can be a finish coat A of an aqueous and non-stick coating, and the top layer 15B can be an aqueous, transparent, and non-stick coating C. Although the finish coat in FIG. 2 is a two-layered structure, the finish coat can be other multi-layered structures of 3, 4, or more layers.

The ceramic paint of the primer 13 in the protective coating 11 can be optionally free of the fluorine-containing polymer. In other words, the fluorine-containing polymer can be formed on the ceramic paint 13 (e.g. the finish coat 15) and/or mixed with the ceramic paint of the primer 13 to increase the non-stick period of the protective coating 11.

In one embodiment, the protective coating is prepared as below. The ceramic paint is coated on a sandblasted, roughed, and degreased surface of a substrate, and the finish coat of a fluorine-containing polymer is coated on the ceramic paint. The substrate is then baked at 100° C. to 180° C. for 1 to 10 minutes, baked at 380° C. to 420° C. for 10 to 20 minutes, and then cooled to complete the protective coating on the substrate. The substrate may resist at least 400□, such as a non-metal substrate of glass or ceramic or a metal substrate of aluminum, aluminum alloy, anodic aluminum oxide, casting aluminum, casting iron, stainless steel, or carbon steel. The ceramic paint can be spray coated, dip coated, or roll coated on the substrate.

The protective coating can be applied on a kitchenware such as a wok, pan, fryer, automatic cooker, sandwich baking pan, cake pan, or grill, and an industry tool such as a thermal transfer, mold, conveyor belt, valve, snow shovel, or roller.

The ceramic paint has excellent adhesion to the substrate, hot hardness, cold hardness, corrosion resistance, and excellent adhesion to the finish coat of the fluorine-containing polymer. The ceramic paint has a long abrasion resistance period due to its surface hardness of 4H to 6H. The finish coat of the fluorine-containing polymer is coated on the primer of the ceramic paint to form a protective coating, which has excellent non-stick properties for a long period. The fluorine-containing polymer in the finish coat and in the ceramic paint of the primer only includes a low amount of PFOA or is totally free of PFO, thereby being safe and environmental friendly.

EXAMPLES

The names and sources of agents used in Examples and Comparative Examples were listed as below:

(1) Fluorine-Containing Polymer:
Powder:
PTFE powder: Dyneon™ PTFE TF 9207Z commercially available from 3M Corporation.
PFA powder: Hyflon® PFA P7010 commercially available from Solvay Solexis Corporation.
MFA powder: Hyflon® MFA P6010 commercially available from (Solvay Solexis Corporation.
Emulsion:
PTFE emulsion: Dyneon™ PTFE TF 5035Z (free of PFOA) commercially available from 3M corporation, or Teflon® PTFE TE-3893 (low PFOA) commercially available from Dupont.
PFA emulsion: Dyneon™ PFA 6910GZ (free of PFOA) commercially available from 3M Corporation.
FEP: Dyneon™ FEP 6300GZ (free of PFOA) commercially available from 3M Corporation.

(2) Silica Sol:
LUDOX® AM-30 commercially available from W. R. Grace & Co., USA.

(3) Organic Silane:
Methyltrimethoxy silane: DOW CORNING® Z-6070 commercially available from Dow Corning Corporation.
Methyltriethoxy silane: WACKER® Silane M1-Triethoxy commercially available from Wacker Chemical.
Phtenylrimethoxy silane: DOW CORNING® Z-6124 commercially available from Dow Corning Corporation.

(4) Color Powder:
Titanium oxide (white): Ti-Pure® R-960 commercially available from Dupont Co., USA.
Copper-manganese-iron oxide (black): Black 444 commercially available from Shepherd Co., USA.
Copper-chromium-manganese oxide (black): 42-303B commercially available from TOMATEC, Japan.

(5) Filler:
Alumina: A-43-L commercially available from Sumitomo Chemical Co., Ltd., Japan.
Silicon carbide: Diamond GC-1200 commercially available from Nanxing Grinding material Co, Ltd., Japan.
Silica: Silverbond 925 commercially available from Sibelco Co.

(6) Catalyst:
Formic acid (98%): commercially available from Sinopharm Chemical Reagent Co., Ltd.
Acetic acid (99.8%): commercially available from Sinopharm Chemical Reagent Co., Ltd.

(7) Silicon Oil:
XIAMETER® PMX-0156: commercially available from Dow Corning Corporation.

(8) Formulation Corresponding to the Finish Coat of a Fluorine-Containing Polymer:
Finish Coat A of Aqueous and Non-Stick Coating:

| Content | Parts by weight |
| --- | --- |
| PTFE emulsion (Dyneon ™ PTFE TF 5035Z) | 54.0 |
| PFA emulsion (Dyneon ™ PFA 6900GZ) | 9.6 |
| Acrylic emulsion | 0.6 |
| Carbon black | 0.25 |
| Silicon carbide (SiC), particle diameter of 2000 mesh | 1.3 |
| TERGITOL ™ TMN-6(90%) | 0.15 |
| Propylene glycol | 3.5 |
| Tetramethyl benzene | 1.6 |

-continued

| Content | Parts by weight |
|---|---|
| Toluene | 0.7 |
| Oleic acid | 0.1 |
| Cerium octanoate (Cerium: 12%) | 0.05 |
| Triethanol amine | 0.15 |
| Water | 28.0 |
| Total | 100 |

Primer B of Aqueous and Non-Stick Coating:

| Content | Parts by weight |
|---|---|
| PTFE emulsion (Dyneon ™ PTFE TF 5035Z) | 20.5 |
| FEP emulsion (Dyneon ™ FEP 6300GZ) | 10.0 |
| Polyamideimide (HI-406) | 22.0 |
| Water glass (AM-30) | 4.0 |
| Carbon black | 2.0 |
| Silicon carbide (SiC), particle diameter of 1200 mesh | 2.84 |
| Wetting dispersant (BYK 192) | 1.8 |
| TERGITOL ™ TMN-6 (90%) | 0.1 |
| N,N-Dimethyl(2-hydroxyethyl)amine | 1.5 |
| Benton clay | 1.26 |
| Anticorrosive agent (zinc phosphate) | 2.75 |
| Water | 31.25 |
| Total | 100 |

Aqueous, Transparent, and Non-Stick Coating C:

| Content | Parts by weight |
|---|---|
| PTFE emulsion (Dyneon ™ PTFE TF 5035Z) | 59.5 |
| PFA emulsion (Dyneon ™ PFA 6900GZ) | 15.9 |
| Acrylic emulsion | 1.7 |
| Carbon black | 0.05 |
| Pearl powder | 0.76 |
| TERGITOL ™ TMN-6 (90%) | 0.10 |
| Propylene glycol | 1.87 |
| Tetramethyl benzene | 0.14 |
| Toluene | 0.05 |
| Oleic acid | 0.06 |
| Cerium octanoate (Cerium: 12%) | 0.04 |
| Triethanol amine | 0.18 |
| Water | 19.65 |
| Total | 100 |

Example 1

100 parts by weight of silica sol, 20 parts by weight of titanium oxide, 10 parts by weight of copper-manganese-iron oxide, 15 parts by weight of silica, and 20 parts by weight of alumina were mixed to grind for 6 hours, and then filtered by a strainer of 100 meshes to form an Agent A. 50 parts by weight of methyltrimethoxy silane and 0.6 parts by weight of formic acid were mixed to form an Agent B. The Agent A and the Agent B were ripened in a sealed container for 3 hours to form a ceramic paint. The ceramic paint was spray coated on a sandblasted, roughed, and degreased surface of an iron wok, and the finish coat A of aqueous and non-stick coating was then spray coated on the ceramic paint. The iron wok was then baked at 100° C. for 10 minutes, baked at 400° C. for 10 minutes, and then cooled to complete a protective coating on the iron wok surface.

Example 2

100 parts by weight of silica sol, 40 parts by weight of copper-manganese-iron oxide, 10 parts by weight of alumina, and 40 parts by weight of silicon carbide were mixed to grind for 6 hours. 20 parts by weight of PTFE powder was added to the grinded mixture to grind for additional 2 hours, and then filtered by a strainer of 100 meshes to form an Agent A. 70 parts by weight of methyltriethoxy silane and 0.7 parts by weight of formic acid were mixed to form an Agent B. The Agent A and the Agent B were ripened in a sealed container for 3 hours to form a ceramic paint. The ceramic paint was spray coated on a sandblasted, roughed, and degreased surface of an iron wok, and the finish coat A of aqueous and non-stick coating was then spray coated on the ceramic paint. The iron wok was then baked at 130° C. for 8 minutes, baked at 400° C. for 10 minutes, and then cooled to complete a protective coating on the iron wok surface.

Example 3

100 parts by weight of silica sol, 45 parts by weight of copper-chromium-manganese oxide, 20 parts by weight of silica, 10 parts by weight of alumina, and 10 parts by weight of silicon carbide were mixed to grind for 6 hours. 40 parts by weight of PFA powder was added to the grinded mixture to grind for additional 2 hours, and then filtered by a strainer of 100 meshes to form an Agent A. 50 parts by weight of methyltrimethoxy silane, 15 parts by weight of methyltriethoxy silane, and 0.8 parts by weight of acetic acid were mixed to form an Agent B. The Agent A and the Agent B were ripened in a sealed container for 3 hours to form a ceramic paint. The ceramic paint was spray coated on a sandblasted, roughed, and degreased surface of an iron wok, and the finish coat A of aqueous and non-stick coating was then spray coated on the ceramic paint. The iron wok was then baked at 150° C. for 5 minutes, baked at 400° C. for 10 minutes, and then cooled to complete a protective coating on the iron wok surface.

Example 4

100 parts by weight of silica sol, 15 parts by weight of titanium oxide, 20 parts by weight of copper-manganese-iron oxide, and 20 parts by weight of silica were mixed to grind for 6 hours. 1 part by weight of MFA powder was added to the grinded mixture to grind for additional 2 hours, and then filtered by a strainer of 100 meshes to form an Agent A. 60 parts by weight of methyltrimethoxy silane, 5 parts by weight of phenyltrimethoxy silane, and 0.8 parts by weight of acetic acid were mixed to form an Agent B. The Agent A and the Agent B were ripened in a sealed container for 3 hours to form a ceramic paint. The ceramic paint was spray coated on a sandblasted, roughed, and degreased surface of an iron wok, and the finish coat A of aqueous and non-stick coating was then spray coated on the ceramic paint. The iron wok was then baked at 180° C. for 1 minute, baked at 380° C. for 20 minutes, and then cooled to complete a protective coating on the iron wok surface.

Example 5

100 parts by weight of silica sol, 50 parts by weight of copper-chromium-manganese oxide, and 30 parts by weight of alumina were mixed to grind for 6 hours. 20 parts by weight of PTFE powder and 30 parts by weight of PFA powder were added to the grinded mixture to grind for additional 2 hours, and then filtered by a strainer of 100 meshes to form an Agent A. 70 parts by weight of methyltrimethoxy silane, 8 parts by weight of phenyltrimethoxy silane, and 0.6 parts by weight of formic acid were mixed to form an Agent B. The Agent A and the Agent B were ripened in a sealed container for 3 hours to form a ceramic paint. The ceramic paint was spray coated on a sandblasted, roughed, and degreased surface of an iron wok, the finish coat A of aqueous and non-stick coating was spray coated on the ceramic paint, and an aqueous, transparent, and non-stick coating C was then spray coated on the finish coat A of aqueous and non-stick coating. The iron wok was then baked at 150° C. for 5 minute, baked at 400° C. for 10 minutes, and then cooled to complete a protective coating on the iron wok surface.

Example 6

100 parts by weight of silica sol, 50 parts by weight of copper-manganese-iron oxide, 30 parts by weight of silica, and 30 parts by weight of silicon carbide were mixed to grind for 6 hours, and then filtered by a strainer of 100 meshes to form an Agent A. 70 parts by weight of methyltrimethoxy silane, 10 parts by weight of phenyltrimethoxy silane, and 0.8 parts by weight of acetic acid were mixed to form an Agent B. The Agent A and the Agent B were ripened in a sealed container for 3 hours, and then mixed with 30 parts by weight of PTFE emulsion to form a ceramic paint. The ceramic paint was spray coated on a sandblasted, roughed, and degreased surface of an iron wok, and the finish coat A of aqueous and non-stick coating was then spray coated on the ceramic paint. The iron wok was then baked at 150° C. for 5 minute, baked at 420° C. for 10 minutes, and then cooled to complete a protective coating on the iron wok surface.

Example 7

100 parts by weight of silica sol, 25 parts by weight of titanium oxide, 35 parts by weight of copper-manganese-iron oxide, 15 parts by weight of silica, and 15 parts by weight of alumina, and 15 parts by weight of silicon carbide were mixed to grind for 6 hours, and then filtered by a strainer of 100 meshes to form an Agent A. 90 parts by weight of methyltrimethoxy silane and 0.8 parts by weight of acetic acid were mixed to form an Agent B. The Agent A and the Agent B were ripened in a sealed container for 3 hours, and then mixed with 15 parts by weight of PTFE emulsion and 15 parts by weight of PFA emulsion to form a ceramic paint. The ceramic paint was spray coated on a sandblasted, roughed, and degreased surface of an iron wok, and the finish coat A of aqueous and non-stick coating was then spray coated on the ceramic paint. The iron wok was then baked at 150° C. for 5 minute, baked at 420° C. for 10 minutes, and then cooled to complete a protective coating on the iron wok surface.

Example 8

100 parts by weight of silica sol, 20 parts by weight of titanium oxide, 35 parts by weight of copper-chromium-manganese oxide, and 55 parts by weight of silicon carbide were mixed to grind for 6 hours, and then filtered by a strainer of 100 meshes to form an Agent A. 100 parts by weight of methyltrimethoxy silane and 0.9 parts by weight of acetic acid were mixed to form an Agent B. The Agent A and the Agent B were ripened in a sealed container for 3 hours, and then mixed with 30 parts by weight of PFA emulsion to form a ceramic paint. The ceramic paint was spray coated on a sandblasted, roughed, and degreased surface of an iron wok, and the finish coat A of aqueous and non-stick coating was then spray coated on the ceramic paint. The iron wok was then baked at 150° C. for 5 minute, baked at 400° C. for 10 minutes, and then cooled to complete a protective coating on the iron wok surface.

Comparative Example 1

100 parts by weight of silica sol, 40 parts by weight of copper-manganese-iron oxide, 20 parts by weight of silica, and 20 parts by weight of alumina were mixed to grind for 6 hours, and then filtered by a strainer of 100 meshes to form an Agent A. 80 parts by weight of methyltrimethoxy silane and 0.6 parts by weight of formic acid were mixed to form an Agent B. The Agent A and the Agent B were ripened in a sealed container for 3 hours, and then mixed with 2 parts by weight of silicon oil to form a ceramic paint. The ceramic paint was spray coated on a sandblasted, roughed, and degreased surface of an iron wok. The iron wok was then baked at 150° C. for 5 minute, baked at 300° C. for 10 minutes, and then cooled to complete a protective coating on the iron wok surface.

Comparative Example 2

The primer B of aqueous and non-stick coating was directly spray coated on a sandblasted, roughed, and degreased surface of an iron wok. The iron wok was then baked at 150° C. for 3 minute, and the finish coat A of aqueous and non-stick coating was then spray coated thereon. The iron wok was then baked at 150° C. for 5 minute, baked at 400° C. for 10 minutes, and then cooled to complete a protective coating on the iron wok surface.

Comparative Example 3

The primer B of aqueous and non-stick coating was directly spray coated on a sandblasted, roughed, and degreased surface of an iron wok. The iron wok was then baked at 150° C. for 3 minute, and the finish coat A of aqueous and non-stick coating and the aqueous, transparent, and non-stick coating C were then spray coated thereon. The iron wok was then baked at 150° C. for 5 minute, baked at 400° C. for 10 minutes, and then cooled to complete a protective coating on the iron wok surface.

The properties of the protective coatings in Examples 1-8 and Comparative Examples 1-3 were tabulated as in Tables 1 and 2, respectively. The properties of the protective coatings were measured as below:

(1) Coating Hardness Test

The hardness of the protective coating was tested by the ASTM D 3363 standard.

(2) Non-Stick Test

A saline of 5% sodium chloride was prepared by analytic grade NaCl and de-ionized water (or distilled water). The saline was poured onto the wok with the described protective coating until the liquid surface of the saline reached at least half a height of the wok. The saline in the wok was boiled by a big fire for 3 minutes. Thereafter, the boiled saline was poured out of the wok, and the salt spot on the wok surface was washed by water. The wok was then dried to process a non-stick test of frying eggs as follow. The wok was heated by an electrical heating plate with a constant voltage 220V and an output power of 1000 W, and the wok surface temperature was measured by a surface thermometer (precision higher than or equal to 2.5 degrees). When the wok surface temperature reached 140° C. to 170° C., a fresh egg was crack opened and then flowed into the wok without adding any cooking oil of vegetable or fat. After the egg white was solidified (the wok surface temperature should not be higher than 210° C.), the egg was removed by a non-metal shovel. Finally, the wok surface being cleaned by a soft cloth without any egg being stuck on the wok was qualified as being non-stick. The cycle of boiling saline of 5% NaCl, pouring out the saline, washing out the salt spots, drying, frying an egg, and cleaning the wok surface to check whether it is non-stick was repeated, until the egg stuck on the wok surface could not be cleaned by the soft cloth. The cycle numbers were counted and recorded.

(3) Abrasive Resistance Test

The wok with the protective coating thereon was put on an abrasion machine (Dupont). A small amount of detergent and water was poured into the wok, and a cleaning pad (3M-7447#) was pressed on the wok by the abrasion machine with a pressure of 4.9 kg to rub the wok surface. The cleaning pad was replaced after 250 rubbing actions. The test was terminated until 10 scratches occurred on the protective coating to expose the wok surface. The rubbing times were counted and recorded.

(4) Saline Resistance Test

The saline resistance of the protective coating was tested according to the QB/T 2421-1998 standard. A saline of 5% sodium chloride was prepared by analytic grade NaCl and de-ionized water (or distilled water). The saline was poured onto the wok with the described protective coating until the liquid surface of the saline reached at least half a height of the wok. The wok was capped, and the saline in the wok was boiled by a big fire, and remained boiling for 7 hours. During the boiling period, the saline was replenished with de-ionized water and distilled water to hold the NaCl concentration thereof. Thereafter, the wok was cooled to room temperature, and then stood at room temperature for 24 hours. The saline was then poured out, and the slat spots were washed out. The protective coating was dried by a soft cloth, and immediately checked by eyes to find rusty spots. The above steps were continuously repeated for two times.

(5) Interlayer Adhesion

The wok after the saline resistance test was tested by the ASTM D3359 standard to check the interlayer adhesion between the primer and the finish coat of the protective coating.

As shown in Tables 1 and 2, the protective coatings in Examples 1-8 had cold hardness, hot hardness, abrasion resistance, and corrosion resistance higher than that of the protective coatings in Comparative Examples 2-3. The protective coatings in Examples 1-8 had non-stick properties similar to that of the protective coatings in Comparative Examples 2-3. Compared to the protective coating in Comparative Example 1, the protective coatings in Examples 1-8 had non-stick properties and corrosion resistance for a longer period.

TABLE 1

| | | Example 1 | Example 2 | Example 3 | Example 4 | Example 5 | Example 6 | Example 7 | Example 8 |
|---|---|---|---|---|---|---|---|---|---|
| silane | Silica sol | 100 | 100 | 100 | 100 | 100 | 100 | 100 | 100 |
| | Methyltrimethoxy silane | 50 | 0 | 50 | 60 | 70 | 70 | 90 | 100 |
| | Methyltriethoxy silane | 0 | 70 | 15 | 0 | 0 | 0 | 0 | 0 |
| | Phenyltrimethoxy silane | 0 | 0 | 0 | 5 | 8 | 10 | 0 | 0 |
| Color powder | Titanium oxide | 20 | 0 | 0 | 15 | 0 | 0 | 25 | 20 |
| | Copper-manganese-iron oxide | 10 | 40 | 0 | 20 | 0 | 50 | 35 | 0 |
| | Copper-chromium-manganese oxide | 0 | 0 | 45 | 0 | 50 | 0 | 0 | 35 |
| filler | Silica | 15 | 0 | 20 | 20 | 0 | 30 | 15 | 0 |
| | Alumina | 20 | 10 | 10 | 0 | 30 | 0 | 15 | 0 |
| | Silicon carbon | 0 | 40 | 10 | 0 | 0 | 30 | 15 | 55 |
| Fluorine-containing polymer | PTFE powder | 0 | 20 | 0 | 0 | 20 | 0 | 0 | 0 |
| | PFA powder | 0 | 0 | 40 | 0 | 30 | 0 | 0 | 0 |
| | MFA powder | 0 | 0 | 0 | 1 | 0 | 0 | 0 | 0 |
| | PTFE emulsion | 0 | 0 | 0 | 0 | 0 | 30 | 15 | 0 |
| | PFA emulsion | 0 | 0 | 0 | 0 | 0 | 0 | 15 | 30 |
| Catalyst | Formic acid | 0.6 | 0.7 | 0 | 0 | 0.6 | 0 | 0 | 0 |
| | Acetic acid | 0 | 0 | 0.8 | 0.8 | 0 | 0.8 | 0.8 | 0.9 |
| Finish coat | Finish coat A of aqueous and non-stick coating | Yes | Yes | Yes | Yes | Yes | Yes | Yes | Yes |
| | Aqueous, transparent, and non-stick coating C | No | No | No | No | Yes | No | No | No |
| | Primer B of aqueous and non-stick coating | No | No | No | No | No | No | No | No |
| Properties | | | | | | | | | |
| Hardness | Cold | 6H | 6H | 6H | 6H | 4H | 6H | 6H | 5H |
| | Hot (180□) | 4H | 4H | 4H | 4H | 2H | 4H | 4H | 4H |
| | Hot (220□) | 3H | 3H | 3H | 3H | H | 3H | 3H | 3H |
| | Non-stick (cycle) | >50 | >50 | >50 | >50 | >50 | >50 | >50 | >50 |
| | Abrasive resistance | 1000 | 2250 | 1500 | 750 | 1250 | 1750 | 1750 | 2500 |
| | Saline resistance test | No rusty spot | No rusty spot | No rusty spot | No rusty spot | No rusty spot | No rusty spot | No rusty spot | No rusty spot |
| | Interlayer adhesion after Saline resistance test | 5B | 5B | 5B | 5B | 5B | 5B | 5B | 5B |

TABLE 2

| | | Comparative Example 1 | Comparative Example 2 | Comparative Example 3 |
|---|---|---|---|---|
| | Silica sol | 100 | 0 | 0 |
| silane | Methyltrimethoxy silane | 80 | 0 | 0 |
| | Methyltriethoxy silane | 0 | 0 | 0 |
| | Phenyltrimethoxy silane | 0 | 0 | 0 |
| Color powder | Titanium oxide | 0 | 0 | 0 |
| | Copper-manganese-iron oxide | 40 | 0 | 0 |
| | Copper-chromium-manganese oxide | 0 | 0 | 0 |
| filler | Silica | 20 | 0 | 0 |
| | Alumina | 20 | 0 | 0 |
| | Silicon carbide | 0 | 0 | 0 |
| Fluorine-containing polymer | PTFE powder | 0 | 0 | 0 |
| | PFA powder | 0 | 0 | 0 |
| | MFA powder | 0 | 0 | 0 |
| | PTFE powder | 0 | 0 | 0 |
| | PFA emulsion | 0 | 0 | 0 |
| Catalyst | Formic acid | 0.6 | 0 | 0 |
| | Acetic acid | 0 | 0 | 0 |
| Silicon oil | | 2 | 0 | 0 |
| Finish coat | Finish coat A of aqueous and non-stick coating | No | Yes | Yes |
| | Aqueous, transparent, and non-stick coating C | No | No | Yes |
| | Primer B of aqueous and non-stick coating | No | Yes | Yes |
| Properties | | | | |
| Hardness | Cold | 9H | 2H | H |
| | Hot (180□) | 9H | H | F |
| | Hot (220□) | 9H | <F | <F |
| | Non-stick (cycle) | 6 | >50 | >50 |
| | Abrasive resistance | 750 | 250 | 500 |
| | Saline resistance test | Rusty spots exist | Rusty spots exist | Rusty spots exist |
| | Interlayer adhesion after Saline resistance test | — | 5B | 5B |

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A protective coating, comprising:
a primer on a substrate; and
a finish coat on the primer,
wherein the primer is a ceramic paint consisting of a mixture of a silica sol-gel, 20 to 60 parts by weight of filler, and 1 to 50 parts by weight of an additional fluorine-containing polymer free of perfluorooctanoic acid, wherein the silica sol-gel is formed by reacting 100 parts by weight of silica sol, 50 to 100 parts by weight of organic silane, and 0.3 to 1 parts by weight of a catalyst, and
wherein the finish coat comprises a fluorine-containing polymer.

2. The protective coating as claimed in claim 1, wherein the substrate comprises glass, ceramic, or metal.

3. The protective coating as claimed in claim 1, wherein the fluorine-containing polymer comprises polytetrafluoroethylene (PTFE), tetrafluoroethylene-perfluoroalkylvinylether copolymer (TFE/PAVE, PFA), tetrafluoroethylene-perfluoromethylvinylether copolymer (TFE/PMVE, MFA), tetrafluoroethylene-hexafluoropropylene copolymer (TFE/HFP, FEP), tetrafluoroethylene-ethylene copolymer (TFE/ethylene, ETFE), or combinations thereof.

4. The protective coating as claimed in claim 1, wherein the silica sol-gel has a solid content of 20% to 50%, and the solid has a particle diameter of 10 nm to 50 nm.

5. The protective coating as claimed in claim 1, wherein the organic silane comprises methyltrimethoxy silane and/or methyltriethoxy silane.

6. The protective coating as claimed in claim 1, wherein the catalyst comprises formic acid, acetic acid, hydrochloric acid, citric acid, methyl formate, ethyl acetoacetate, maleic anhydride, or combinations thereof.

7. The protective coating as claimed in claim 1, wherein the filler comprises silica, alumina, zirconium dioxide, silicon carbide, aluminum nitride, boron nitride, kaolin, talcum powder, mica powder, silicate of aluminum or zirconium, barium sulfate, metal fiber, stainless powder, or combinations thereof.

8. The protective coating as claimed in claim 1, wherein the filler has a particle diameter of 0.05 μm to 30 μm.

9. The protective coating as claimed in claim 1, wherein the additional fluorine-containing polymer comprises polytetrofluoroethylene (PTFE), tetrafluoroethylene-perfluoroalkylvinylether copolymer (TFE/PAVE, PFA), tetrafluoroethylene-perfluoromethylvinylether copolymer (TFE/PMVE, MFA), tetrafluoroethylene-hexafluoropropylene copolymer (TFE/HFP, FEP), tetrafluoroethylene-ethylene copolymer (TFE/ethylene, ETFE), or combinations thereof.

10. The protective coating as claimed in claim 1, wherein the finish coat is a multi-layered structure.

11. The protective coating as claimed in claim 1, wherein the substrate is a part of a kitchenware.

12. The protective coating as claimed in claim 11, wherein the kitchenware comprises a wok, pan, fryer, automatic cooker, sandwich baking pan, cake pan, or grill.

13. The protective coating as claimed in claim 1, wherein the substrate is a part of an industry tool.

14. The protective coating as claimed in claim 13, wherein the industry tool comprises a thermal transfer, mold, conveyor belt, valve, snow shovel, or roller.

15. A protective coating, comprising:
a primer on a substrate; and
a finish coat on the primer,
wherein the primer is a ceramic paint consisting of a mixture of a silica sol-gel, 20 to 60 parts by weight of filler, and 1 to 50 parts by weight of an additional fluorine-containing polymer free of perfluorooctanoic acid, wherein the silica sol-gel is formed by reacting 100 parts by weight of silica sol, 50 to 100 parts by weight of organic silane, 5 to 10 parts by weight of an additional organic silane, and 0.3 to 1 parts by weight of a catalyst, and
wherein the finish coat comprises a fluorine-containing polymer, and the additional organic silane comprises tetramethoxy silane, tetraethoxy silane, dimethyldimethoxy silane, dimethyldiethoxy silane, phenyltrimethoxy silane, or combinations thereof.

16. A protective coating, comprising:
a primer on a substrate; and
a finish coat on the primer,
wherein the primer is a ceramic paint consisting of a mixture of a silica sol-gel, 20 to 60 parts by weight of filler, 20 to 60 parts by weight of color powder, and 1 to 50 parts by weight of an additional fluorine-containing polymer free of perfluorooctanoic acid, wherein the silica sol-gel is formed by reacting 100 parts by weight of silica sol, 50 to 100 parts by weight of organic silane, and 0.3 to 1 parts by weight of a catalyst, and
wherein the finish coat comprises a fluorine-containing polymer.

* * * * *